United States Patent
Karaoguz et al.

(10) Patent No.: US 9,854,505 B2
(45) Date of Patent: Dec. 26, 2017

(54) SERVICE ADVERTISEMENT IN A COMMUNICATION DEVICE

(75) Inventors: Jeyhan Karaoguz, Irvine, CA (US); James D. Bennett, Hroznetin (CZ)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1666 days.

(21) Appl. No.: 12/367,142

(22) Filed: Feb. 6, 2009

(65) Prior Publication Data
US 2010/0202423 A1    Aug. 12, 2010

(51) Int. Cl.
   H04W 48/12    (2009.01)
   G06Q 30/02    (2012.01)
   H04L 29/08    (2006.01)
   H04L 29/06    (2006.01)
   H04W 48/18    (2009.01)

(52) U.S. Cl.
   CPC ........ *H04W 48/12* (2013.01); *G06Q 30/0241* (2013.01); *H04L 67/16* (2013.01); *H04L 69/18* (2013.01); *H04W 48/18* (2013.01)

(58) Field of Classification Search
   None
   See application file for complete search history.

(56) References Cited

U.S. PATENT DOCUMENTS

| 5,974,398 | A * | 10/1999 | Hanson | G06Q 30/02 |
| | | | | 379/88.2 |
| 6,539,482 | B1 * | 3/2003 | Blanco | G06F 21/31 |
| | | | | 713/182 |
| 2002/0176391 | A1 | 11/2002 | Hermann et al. | |
| 2003/0023489 | A1 * | 1/2003 | McGuire | G06Q 30/02 |
| | | | | 705/14.55 |
| 2004/0255302 | A1 | 12/2004 | Trossen | |
| 2005/0078644 | A1 | 4/2005 | Tsai et al. | |
| 2007/0286100 | A1 | 12/2007 | Saaranen et al. | |

FOREIGN PATENT DOCUMENTS

EP    1435721 A2    7/2004

OTHER PUBLICATIONS

European Patent Office, Communication and European Search Report in EP10000815.0, dated Jun. 18, 2010.
Office Action issued in Chinese patent application No. 201010124798.2, dated Jul. 13, 2012, 6 pages.

* cited by examiner

*Primary Examiner* — John Van Bramer
(74) *Attorney, Agent, or Firm* — Foley & Lardner LLP (57) ABSTRACT

A communication device is operable to receive broadcast information communicated by a network access device specifying one or more advertised services provided via the network access device. The communication device then determines whether to connect via the network access device based on the received information. The network access device comprises an IEEE 802.11 access point, a user end-point device, a private access point network access device, and/or a wired network routing device. The advertisement broadcast is performed via beacon signals, other broadcast messages, and/or utilizing advertisement framing procedure, wherein service related information are set directly into beacons signal messaging, and/or communicated via advertisement subframes. The advertisement communication may comprise a multi-stage procedure, where a first stage enables obtaining service related information without attachment and/or full login into the network access device. User authentication and/or validation may be performed in subsequent stages.

20 Claims, 7 Drawing Sheets

SERVICE ADVERTISEMENT IN A COMMUNICATION DEVICE

CROSS-REFERENCE TO RELATED APPLICATIONS/INCORPORATION BY REFERENCE

This application makes reference to:
U.S. application Ser. No. 12/367,103, filed on Feb. 6, 2009;
U.S. application Ser. No. 12/327,265, filed on Dec. 3, 2008; and
U.S. application Ser. No. 12/327,295, filed on Dec. 3, 2008.

Each of the above stated applications is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to communications. More specifically, certain embodiments of the invention relate to a method and system for service advertisement in a communication device.

BACKGROUND OF THE INVENTION

The growth of system connectivity has been one of the major developments in recent years. Fewer and fewer systems are operating as stand-alone systems, and most of today's systems are increasingly becoming elements of one or more larger or complex networks. This growth in various networking technologies have provided improved performance and increased flexibility for these networks. Various wired and/or wireless based communication standards have been developed to satisfy demands for ever expanding system connectivity. The growth of system connectivity has also spurred a growth in applications that takes advantage of the benefits offered by the improved system connectivity, especially those having access to entities that provides improved processing and/or storage capabilities.

Communication end-point devices, which are mobile and/or stationary, comprise a plurality of wireless technologies to enable use of various interfaces for transmitting and/or receiving data. For example, mobile devices, which enable cellular connectivity, have become a near absolute necessity in today's world. While mobile technology originally evolved from traditional land-based communication technologies, and was merely intended to add an element of mobility to the traditional telephony service, this technology has grown beyond that initial purpose. Many modern mobile technologies, including such technologies as GSM/GPRS/EDGE, UMTS, CDMA2000, and LTE, incorporate substantial data capabilities. Most of today's mobile services comprise such features as text messaging, audio/video streaming, and web browsing. Modern mobile devices, for example cell phones and/or smart phones, are utilized to support additional services via other wireless interfaces, for example, wireless personal area networks (WPAN) and/or wireless local area network (WLAN) interfaces.

The use of wireless personal area networks (WPAN) continues to gain popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). An exemplary WPAN system utilizes a standardized technology such as Class 2 Bluetooth (BT) technology. While WPAN may be very beneficial for certain applications, other applications may require larger service areas and/or capabilities. To satisfy such needs, other technologies such as Wireless local area networks (WLAN) have been developed to provide greater wireless service. In contrast to the WPAN systems, WLAN provide connectivity to devices that are located within a slightly larger geographical area, such as the area covered by a building or a campus, for example.

WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system. Some WLAN systems are operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, mobile technology enables the use of the mobile phone as a form of wireless modem that allows connecting a laptop, for example, to the internet via a mobile network. More recently, Worldwide Interoperability for Microwave Access (WiMAX) based systems have become popular, and use of WiMAX to provide wireless connectivity is expanding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for service advertisement in a communication device, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for service advertisement in a communication device. In accordance with various embodiments of the invention, a communication device is operable to receive broadcast information communicated by network access device, wherein the communicated broadcast specifies one or more advertised services available via the network access device. The communication device then determines whether to connect via the network access device, based on the received broadcasted information advertising available services. The advertised services comprise, for example, providing media streaming, audio and/or video processing, and/or offline storage and/or processing. The services are available either directly via the devices and/or systems that are external to and/or remote to the network access device are accessed through the network access device. The services are available either directly via the network access device, and/or via devices and/or systems that are external to and/or remote from the network access device. The network access device comprises, for example, an IEEE 802.11 access point, a user end-point device, a private access point network access device, and/or a wired network routing device. The network access device broadcasts the advertisement information via beacon signals and/or other types of broadcast messages and/or utilizing advertisement framing procedure. In instances where beacon signal messaging is utilized in service advertisement, related advertised information is placed directly into fields and/or substructures within beacons signal messages. The advertisement framing procedure comprises communicating service advertisement information via advertisement subframes when the network access device utilizes superframe based communication.

The advertisement communication between the communication device and the network access device comprises, for example, a multi-stage procedure. During a first stage of the advertisement communication, the communication device is operable to only receive general and/or limited service related information. The communication device, however, need not attach to the network access device or securely login into the network serviced by the network access device. In subsequent stages, however, attachment and/or login operations, which may comprise session initiation, user authentication and/or validation and security setup, may be necessary. The communication device is then operable to receive more specific and/or detailed information regarding advertized services, and/or to negotiate for improved servicing operations.

Figure 1A:
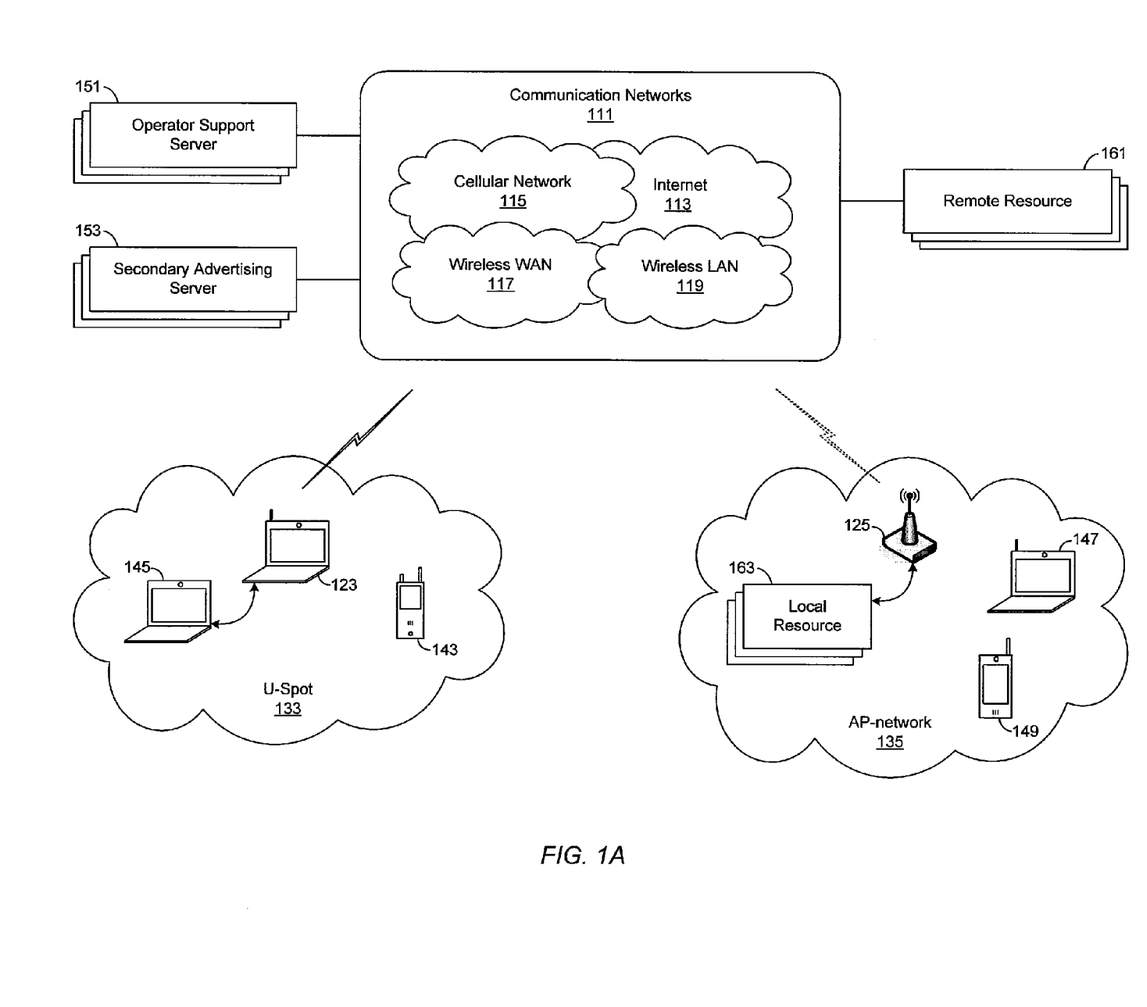
FIG. 1A is a block diagram that illustrates an exemplary service advertisement in private access point and user spot (U-Spot) networks, in accordance with an embodiment of the invention.

FIG. 1A is a block diagram that illustrates an exemplary service advertisement in private access point and user spot (U-Spot) networks, in accordance with an embodiment of the invention. Referring to FIG. 1A, there is shown a plurality of communication networks 111, Internet 113, a cellular network 115, a wireless wide area network (WWAN) 117, a wireless local area network (WLAN) 119, a U-spot servicing device 123, and a private access point servicing device 125. FIG. 1A also shows a U-Spot network 133, a private AP network 135, communication devices 141, 143, 145, 147, and 149, one or more operator support servers 151, one or more secondary advertising servers 153, one or more remote resource 161, and one or more local resources 163.

The plurality of communication networks 111 comprises one or more networks that are operable to enable wireless and/or wired communication among a plurality of local and/or remote entities. The network connectivity available via the plurality of communication networks 111 is based on one or more communication standards and/or protocols. The plurality of communication networks 111 comprises, for example, the Internet 113, the cellular network 115, the WWAN 117, and/or the WLAN 119. The Internet 113 comprises a system of interconnected networks to enable exchange of data between a plurality of nodes, based on one or more networking standards, including, for example, the Internet protocol (IP). The physical connectivity is provided in the Internet 113, for example, via the Public Switched Telephone Network (PSTN), via copper wires, fiber-optic cables, wireless interface, and/or other standards-based interfaces. The transport functionality is performed in the Internet 113, for example, based on one or more protocols, including, for example, the TCP/IP protocol. The cellular network 115 is operable to enable communication and/or connectivity via one or more cellular technologies. Exemplary cellular technologies comprise CDMA, WCDMA, CDMA1000, HSDPA, GSM, GPRS, EDGE, and/or UMTS. The WWAN 117 is operable to enable communication and/or connectivity via one or more wireless wide network area standards and/or protocols. Exemplary wireless wide network area technologies comprise, for example, WiMAX based networks. The WLAN 119 is operable to enable communication and/or connectivity via one or more wireless local network area standards and/or protocols. Exemplary wireless local network area technologies comprise, for example, IEEE 802.11 based interfaces.

Each of the communication devices 143, 145, 147, and 149 comprises a personal end-point device that is operable to enable performing tasks and/or applications requested via users of the communication devices. In an exemplary aspect of the invention, the communication devices 143, 145, 147, and 149 are operable to communicate with a local servicing communication device, for example the AP servicing device 125 and/or the U-Spot servicing device 123, to form communication pathways that support one or more applications originating and/or terminating in the communication devices. Exemplary devices comprise a PDA, a Smart phone, a laptop and/or a PC that are operable to enable utilizing one or more wired and/or wireless communication interface. Exemplary wireless and/or wired interfaces comprise, for example, WiFi, Bluetooth and/or other personal area network (WPAN) based interfaces, USB, and/or proprietary inter-device standards based interfaces.

The U-spot servicing device 123 is operable to establish and/or service a private user networks which may also be referred to as user networks or user spot (U-Spot) networks, for example the U-Spot network 133. The U-spot servicing device 123 comprises, for example, a portable communication device that is substantially similar to any of the communication devices 143, 145, 147, and/or 149, and is similarly operable to perform tasks and/or applications requested by devices' users. Additionally, the U-Spot servicing device 123 comprises suitable logic, circuitry and/or code that enable U-Spot related setup, management, and/or control operations in the U-Spot network 133. In order to facilitate providing network accessibility servicing via U-Spot networks, the U-spot servicing device 123 are operable to enable network connectivity to one or more of the communication networks 111, via one or more wireless and/or wired interfaces. For example, the U-spot servicing devices 123 may be operable to utilize cellular links, Ethernet links, WiMAX links, and/or 802.11 links to enable establishing network connectivity via the Internet 113, cellular network 115, the WWAN 117, and/or the WLAN 119.

The private AP servicing device 125 comprises a privately owned and/or operated communication device that is dedicated to establish and/or service of the private AP network 135. The private AP servicing device 125 comprises suitable logic, circuitry and/or code that enable performing network setup, management, and/or control operations, within the private AP network 135. Additionally, and to facilitate providing network accessibility servicing via private AP networks, the private AP servicing device 125 are operable to enable network connectivity to one or more of the communication networks 111, via one or more wireless and/or wired interfaces. For example, the private AP servicing device 125 may be operable to utilize cellular links, Ethernet links, WiMAX links, and/or 802.11 links to enable establishing network connectivity via the Internet 113, cellular network 115, the WWAN 117, and/or the WLAN 119.

The operator support server 151 comprises suitable logic, circuitry, and/or code that enable providing and/or managing network accessibility. The operator support server 151 is utilized, for example, by service providers to enable providing access to one or more of the plurality of communication networks 111 to one or more users. The operator support server 151 is operable to enable managing user accounts and/or network access during operations of the U-Spot servicing device 123, the private AP servicing device 125, and/or any of the communication devices 143, 145, 147, and/or 149. The secondary advertising server 153 comprises suitable logic, circuitry, and/or code that enable providing supporting and/or supplementing advertising operations in the private AP network 135; via the private AP servicing device 125.

The remote resource 161 comprises suitable logic, circuitry and/or code that enable supporting services provided via U-Spot and/or private AP servicing devices. The remote resource 161 is operable, for example, to provide processing and/or storage operations that are unavailable directly via the U-Spot servicing device 123 and/or the private AP servicing device 125, but which are necessary to facilitate providing servicing operations in the private AP network 135. The remote resources 161 may comprise, for example, a home PC that comprises improved processing subsystems and/or increased memory space, which may be utilized to store and/or retrieve media streams that are offered in the private AP network via the AP servicing devices. The local resource 163 is substantially similar to the remote resource 161, and is also operable to service operations provided via U-Spot and/or private AP servicing devices, providing for example, processing and/or storage operations that are unavailable directly in these devices. The local resource 163, however, is operable to enable local and/or direct communication with U-Spot and/or private AP servicing devices, via one or more wired and/or wireless links that are available via the servicing devices. For example, the local resource 163 may comprise a laptop, for example, which is operable to communicate with the private AP servicing device 125, via WiFi and/or Ethernet crossover cable, to enable storage and/or retrieval of media streams that are offered in the private AP network 135 via the private AP servicing device 125.

In operation, the U-Spot servicing device 123 and/or the private AP servicing device 125 are operable to establish the U-Spot network 131 and the private AP network 135, respectively. Communication devices that are communicatively coupled to the U-Spot servicing device 123 and/or the private AP servicing device 125, such as the communication devices 143, 145, 147 and/or 149 for example, are operable to request and/or receive services available via the U-Spot network 133 and/or the private AP network 135. The services provided via the U-Spot network 133 and/or the private AP network 135 comprise, for example, network accessibility. For example, the U-Spot servicing device 123 is operable to obtain network connectivity to one or more of the plurality of the communication networks 111, via one or more wired and/or wireless links. The network connectivity of the U-Spot servicing device 125 is established, for example, via a WiMAX wireless link, a cellular link, an 802.11 link, an Ethernet based wired connection, and/or fiber optical cables. Accordingly, the communication devices 143 and/or 145 are operable to request network connectivity through the U-Spot network 133, via the U-Spot servicing device 123. The connection between the communication devices 143 and/or 145, and the U-Spot servicing device 123 is setup via a wireless connection, over Bluetooth link for example, and/or via a wired connection such as an Ethernet crossover cable, for example. The private AP servicing device 125 is similarly operable to provide network connectivity to the communication devices 147 and/or 149.

In addition to network accessibility, other services may also be available via private AP and/or U-Spot networks. For example, the U-Spot servicing device 123 and/or the private AP servicing device 125 are operable to offer dedicated storage, processing, and/or multimedia streaming services in the U-Spot network 133 and/or the private AP network 135. The additional services are provided directly via the U-Spot servicing device 123 and/or the private AP servicing device 125, and/or utilizing the local resource 163 and/or the remote resource 161 are operable to provide operations that are necessary for providing the additional services. These services may also be available where the U-Spot network 133 and/or the private AP network 135 are inoperable to provide network connectivity. For example, where the private AP servicing device 125 losses its connectivity to the plurality of communication networks 111, the private AP servicing device 125 offers in the private AP network 135, services based on data and/or functionality that is available locally within the private AP servicing device 125 and/or the local resource 163, which is available in the private AP network 135 regardless of availability of external network accessibility in the private AP servicing device 125. The communication devices 147 and/or 149 are operable, for example, to connect to the private AP servicing device 125, via an 802.11 link, to request and/or retrieve video and/or audio streams that are stored in and/or played via the private AP servicing device 125, from the local resource 163 for example. The private AP servicing device 125 may also be operable as a centralized gaming consol to provide gaming applications in the private AP network 135 based on internally maintained data and/or functionality.

The servicing operations available via the U-Spot network 133 and/or the private AP network 135 may be incentivized. In this regard, the servicing operations are incentivize to the servicing devices, for example, by enabling them, and/or their users, to receive and/or claim compensation, pay and/or credit for provide private AP and/or U-Spot services. The credit received for provide private AP and/or U-Spot networking is utilized, for example, to compensate for costs otherwise charged by service provider when the AP servicing devices are utilized to access networks operated by the service providers. The user accounts corresponding to the devices utilizing the private AP and/or U-Spot network servicing operations may be adjusted to bill and/or debit their users for services provided via the private AP networks. The operator support server 151 is operable, for example, to manage accounts corresponding to the U-Spot servicing device 123, the private AP servicing device 125, and/or the communication devices 143, 145, 147 and/or 149. Accordingly, the U-Spot servicing device 123 and/or the private AP servicing device 125 is operable to request credit and/or billing adjustments for servicing the communication devices 143, 145, 147 and/or 149, via the operator support server 151.

The private AP and/or U-Spot network servicing operations are also incentivized to the requesting devices. For example, U-Spot and/or private AP network servicing operations may be preferred because they offer more reliable network connectivity, improved bandwidth, and more suitable content, functionality and/or networking capabilities. In an exemplary aspect of the invention, the servicing and serviced devices are operable to negotiate incentivized arrangements, to enhance servicing incentives with regard to the serviced devices, to the servicing devices, and/or to service providers. For example, where the U-Spot servicing device 123 is only offering 10% of its available network bandwidth for networking accessibility in the U-Spot network 133, the communication device 143 is operable to negotiate with the U-Spot servicing device 123 for allocation of 20% of the available bandwidth in exchange for larger credit and/or higher pay.

In exemplary aspect of the invention, advertisement operations are also be utilized to advertise services available via servicing devices. For example, the U-Spot servicing device 123 and/or the private AP servicing device 125 may be operable to transmit broadcast beacons signals. In addition to providing information that enable identifying and/or locating the U-Spot network 133 and/or the private AP network 135, the beacon signals also comprise information that advertises the services available in the networks. The service information communicated via the beacon signals comprise, for example, listings of available services and/or details pertaining to the parameters and/or characteristics of the services offered. Consequently, communication devices, the communication devices 143, 145, 147 and/or 149, for example, are operable to search for beacon signals that enable the communication devices to locate the U-Spot network 133 and/or the private AP network 135.

The communication devices 143, 145, 147, and/or 149 are also operable to utilize the beacon signals to determine services available in U-Spot network 133 and/or the private AP network 135, via the U-Spot servicing device 123 and/or the private AP servicing device 125, respectively. After initial and/or general determination of available services, the communication devices seeking services may be operable to communicate with the servicing devices to perform additional service inquiry, negotiation, setup and/or control operations. For example, after initial determination of available services in the U-Spot network 133 and/or the private AP network 135, via beacon signals, the communication devices 143, 145, 147, and/or 149 are operable to communicate with U-Spot servicing device 123 and/or the private AP servicing device 125 to request specific and/or detail information about services of interest, to perform necessary negotiations pertaining to offered services, and/or to perform necessary configuration operations to facilitate use of selected services.

In an exemplary aspect of the invention, the U-Spot servicing device 123 and/or the private AP servicing device 125 are also operable to utilize user-interface communication functionality, to facilitate interactions with serviced devices. The user-interface communication functionality is operable, for example, to enable user-friendly interactions between the servicing devices 123 and/or 125, and communication devices in the U-Spot network 133 and/or the private AP network 135. The U-Spot servicing device 123 and/or the private AP servicing device 125 are operable, for example, to utilize personalized markup language interfaces, comprising, for example, HTML, XML, and/or other suitable text, audio and/or video interfaces. The user-interface communication functionality may also be operable during advertising and/or configuring services available in the corresponding U-Spot network 133 and/or the private AP network 135. For example, the user-interface may be operable, via the communication devices 143, 145, 147, and/or 149, to complete service inquiry, negotiation, setup, and/or control.

Figure 1B:
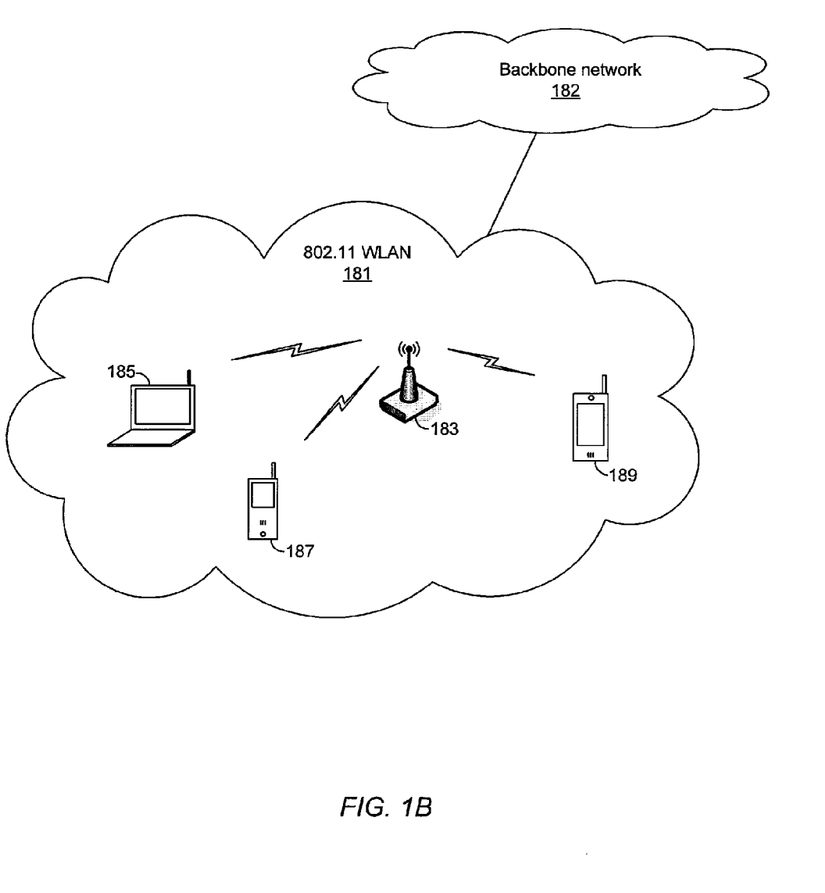
FIG. 1B is a block diagram that illustrates an exemplary IEEE 802.11 wireless local area network (WLAN) that utilizes service advertisement, in accordance with an embodiment of the invention.

FIG. 1B is a block diagram that illustrates an exemplary IEEE 802.11 wireless local area network (WLAN) that utilizes service advertisement, in accordance with an embodiment of the invention. Referring to FIG. 1B, there is shown an IEEE 802.11 WLAN 181, an access point 183, and a plurality of client devices 185, 187, and 189.

The access point 183 comprises suitable logic, circuitry, and/or code operable to provide network access to a plurality of client devices via wireless links. The access point 183 is utilized, for example, to service a local wireless network in the IEEE 802.11 WLAN 181, providing network access to suitable devices via, for example, IEEE 802.11 links. For example, the access point 183 may be utilized to enable the client devices 185, 187 and/or 189 to request and/or receive network access in the IEEE 802.11 WLAN 181, via IEEE 802.11 based connections, to the backbone network 182. The backbone network 182 comprises private and/or public network that is operable to facilitate exchange of traffic among a plurality of nodes, based on one or more networking standards, including, for example, the internet protocol (IP). The backbone network 182 corresponds to, for example, a service provider or the Internet.

Each of the client devices 185, 187 and 189 comprise a communication device that is operable to become client station (STA) in an IEEE 802.11 network. An exemplary device comprises a PDA, a Smartphone, and/or a laptop that is operable to utilize IEEE 802.11 links to transmit and/or receive data, via the access point 183 for example. The IEEE 802.11 support is provided via integrated and/or plug-in 801.11 capabilities. For example, integrated and/or plug-in wireless NIC cards may be utilized to facilitate use of IEEE 802.11 interfaces via the client devices 185, 187 and 189.

In operation, the access point 183 is operable to provide network accessibility in the IEEE 802.11 WLAN 181 to one or more of the client device 183, 185, and/or 189, to enable transmitting and/or receiving traffic packet by the client devices 185, 187 and/or 189 via the backbone 182. The access point 183 is operable to broadcast information to the client devices 185, 187, and/or 189, which enables them to obtain network connectivity via the access point 183. The access point 183 transmits beacon signals that may be utilized via the client device 185, 187, and/or 189 to locate the access point 183. The structure of the beacon messages is defined by IEEE 802.11 standards, and comprises access related information, including, for example, network identifier, security parameters and/or product information that enable identifying the access point 183 to facilitate inter-device attachment between the access point 183 and the client devices.

In an exemplary aspect of the invention, the access point 183 is operable to utilize the beacon signaling to advertise services available via the access point 183. The access point 183 is operable, for example, to provide dedicated services in the IEEE 802.11 WLAN 181 to client devices, in addition to network connectivity. The services comprise, for example, providing media streaming and/or access to local and/or remote dedicated processing and/or storage devices. Accordingly, the Access point 183 is operable to utilize the beacon signals to provide, in addition to access related information, information pertaining to the additional services that are available via the access point 183 in the IEEE 802.11 WLAN 181. For example, a plurality of service fields may be added in the messages communicated as beacons signals by the access point 183. The plurality of service fields comprises information pertaining to services available in the IEEE 802.11 WLAN 181, via the access point 183. In an exemplary aspect of the invention, service information may also be communicated via the IEEE 802.11 framing scheme utilized via the access point 183 during communication with the STAs, the client devices 185, 187 and/or 189 for example, services by the access point 183. A plurality of services frames may be allocated to, and utilized for communicating information pertaining to services available in the IEEE 802.11 WLAN 181. The services frames are used instead of and/or in addition to use of beacon signaling to perform service advertisement.

Figure 1C:
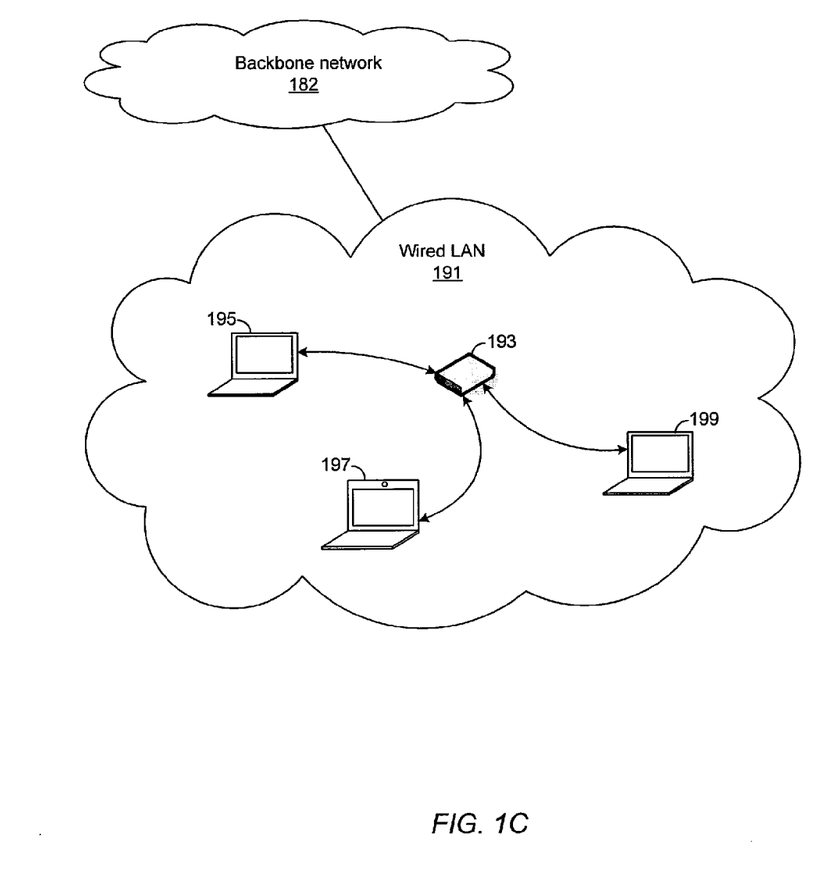
FIG. 1C is a block diagram that illustrates an exemplary wired local area network (LAN) that supports service advertisement, in accordance with an embodiment of the invention.

FIG. 1C is a block diagram that illustrates an exemplary wired local area network (LAN) that supports service advertisement, in accordance with an embodiment of the invention. Referring to FIG. 1C, there is shown wired local area network (LAN) 191, a routing device 193, and a plurality of client devices 105, 107, and 109.

The routing device 193 comprises suitable logic, circuitry, and/or code operable to provide network access to a plurality of client devices via wired links. The routing device 193 is utilized, for example, to service the wired LAN 191, providing network access to suitable devices via, for example, wired links. Exemplary wired connections comprise Ethernet cables and/or fiber optic cables. For example, the routing device 193 may be utilized to enable the client devices 195, 197 and/or 199 to request and/or receive network access in the wired LAN 191, via wired LAN based connections, to the backbone network 182. The backbone network 182 comprises private and/or public network that is operable to facilitate exchange of traffic among a plurality of nodes, based on one or more networking standards, including, for example, the Internet protocol (IP). The backbone network 182 corresponds to, for example, a service provider or the Internet.

Each of the client devices 195, 197 and 199 comprises a communication device that is operable to become client device in a wired LAN network. Exemplary devices comprise portable communication devices, laptops and/or other PCs that are operable to enable utilizing wired links to transmit and/or receive data, via the routing device 193 for example. The wired LAN support is provided via integrated and/or plug-in networking capabilities. For example, integrated and/or plug-in wireless NIC cards may be utilized to facilitate use of wired LAN interfaces via the client devices 195, 197 and 199.

In operation, the routing device 193 is operable to provide network accessibility in the wired LAN 191 to one or more of the client device 193, 195, and/or 199. The client devices 195, 197 and/or 199 are then operable to transmit and/or receive traffic packets though the backbone network 182. In an exemplary aspect of the invention, the routing device 193 is operable to communicate advertisement information to client devices serviced by the routing device 193 in the wired LAN 191. The routing device 193 is operable, for example, to provide services in the wired LAN 191 to client devices, in addition to network connectivity. The services comprise, for example, providing media streaming and/or access to local and/or remote dedicated processing and/or storage devices. The advertisement information comprise information pertains to, for example, the services available in the wired LAN 191. Various techniques may be utilized to communicating the advertisement information by the routing device 193. The wired LAN 191 may utilize token ring scheme, for example, and the routing device 193 may then push advertisement packets to the client devices 195, 197 and/or 199. In another embodiment, where only peer-to-peer wired based connections are utilized between the routing device 193 and each of the client devices 195, 197 and/or 199; the routing device 193 is operable to transmit advertisement related data to the client devices. The transmission of the advertisement data is performed periodically, in response to solicitation via the client devices, and/or dynamically, triggered by one or more predetermined conditions and/or events.

Figure 2A:
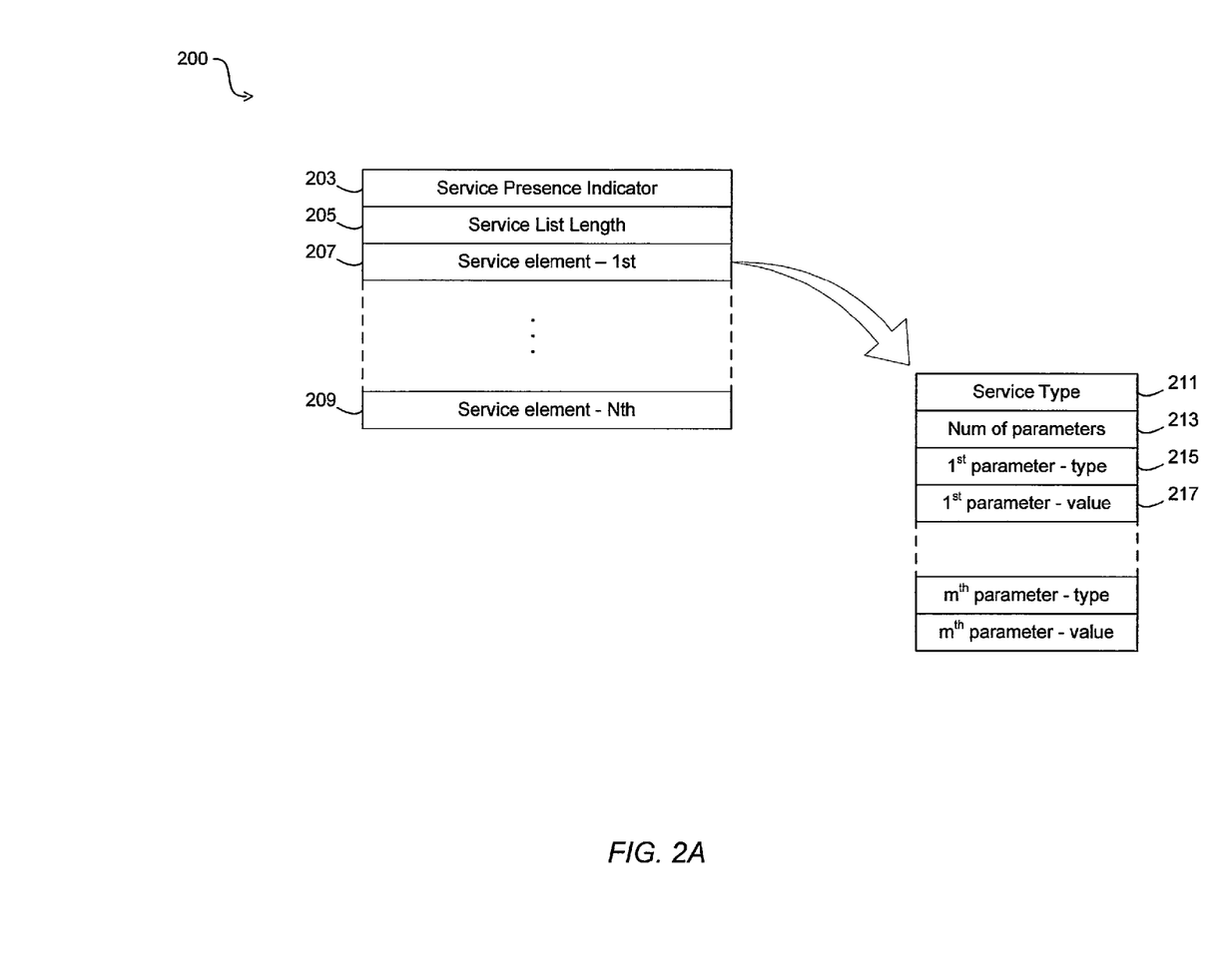
FIG. 2A is a block diagram that illustrates an exemplary message substructure utilized via beacon signals to advertise services available via network access device, in accordance with an embodiment of the invention.

FIG. 2A is a block diagram that illustrates an exemplary messaging substructure utilized via beacon signals to advertise services available via network access device, in accordance with an embodiment of the invention. Referring to FIG. 2A, there is a shown a service advertisement substructure 200, which is utilized to enable communicating service related information. The service advertisement substructure 200 comprises, for example, a plurality of fields, of fixed and/or dynamic length, which are populated, if necessary, to provide information pertaining to services available via a device that utilizes the service advertisement substructure 200. For example, the service advertisement substructure 200 may comprise a service presence indicator field 203, a service list length field 205, and plurality of service element fields 207, . . . , 209. The presence indicator field 203 comprises, for example, a plurality of bits and/or bytes wherein predefined values are set to indicate whether service advertisement substructure 200 comprises service information or not. The service list length comprises, for example, a plurality of bits and/or bytes that are set to a value that represent the number of service elements populated in an instance of service advertisement substructure 200.

Each of the service element fields 207, . . . , 209, comprises plurality of bits and/or bytes that are utilized to provide information pertaining to a specific service. The service element may be further defined as a substructure with subfields, which are set to provide specific and/or detailed information regarding a service. For example, the first service element 207 may comprise a service type subfield 211, which identifies the service, a number of parameters subfield 213, which defines the size of list of parameters provided, wherein each parameter, is defined by a parameter type field 215 and parameter value 217. For example, where the first service element 207 may be utilized to define a video streaming service, the service type subfield 211 is set to indicate video streaming; the number of parameters subfield 213 is set based on the number of parameters defined for the services. The 1$^{st}$ parameter type subfield 215 may be set to indicate that the parameter is streaming bitrate, and the 1$^{st}$ parameter value subfield 217 may be set to value corresponding to the streaming bit rate utilized for the video streaming service.

In operation, the service advertisement substructure 200 is utilized to enable messaging based service advertisement communication via network access devices. For example, the service advertisement substructure 200 may be incorporated into the beacon messaging broadcasted via the U-Spot servicing device 123, the private AP servicing device 133, and/or the access point 183, to enable service advertisement via beacon signaling in these devices.

Figure 2B:
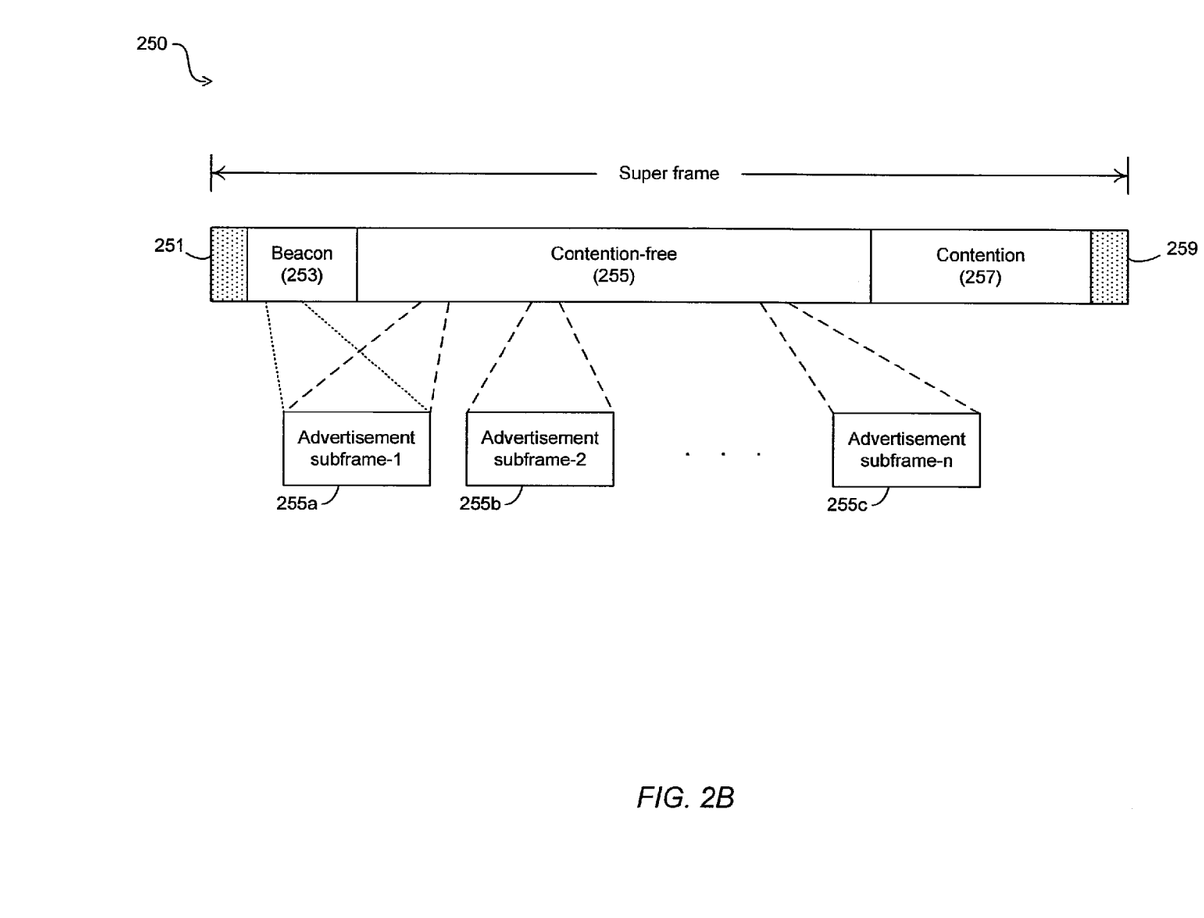
FIG. 2B is a block diagram that illustrates an exemplary framing structure that is utilized to advertise services available via network access device in superframes, in accordance with an embodiment of the invention.

FIG. 2B is a block diagram that illustrates an exemplary framing structure that is utilized to advertise services available via network access device in superframes, in accordance with an embodiment of the invention. Referring to FIG. 2B, there is shown a superframe 250 that is utilized to enable performing service advertisement operation via frames. The superframe 250 is utilized, for example, to enable periodic and/or predictable communication between network access devices and communication devices. For example, the superframe 250 may correspond to 802.11 superframes that are utilized in 802.11 networks to enable scheduling communication between client STA devices and 802.11 access points. The superframe 250 may be of fixed and/or predetermined duration. The transitional segments 251 and 259 are utilized to enable clean transition from previous instances and/or to subsequent instances of the superframe, respectively. The network access device broadcasts beacon signaling during the beacon segment 253. The superframe 250 may comprise a contention period 257, where currently serviced client devices and/or new client services compete for connectivity with and/or services provided by the servicing device. During contention-free period 255, currently serviced client devices are enabled to communicate with the servicing device, receiving from, and/or transmitting data and/or messaging to the network access device. In an exemplary aspect of the invention, a plurality of advertisement subframes 255a, . . . , 255c are utilized to communicate service related information by the network access device. The subframes 255a, . . . , 255c are communicated, for example, during the contention-free period 255. At least some of the subframes 255a, . . . , 255c may also be communicated during the beacon segment 253 and/or the contention period 257.

In operation, the superframe 250 is utilized to enable frame-based service advertisement communication via network access devices. For example, the U-Spot servicing device 123, the private AP servicing device 125, and/or the access point 183, are operable to utilize the superframe 250 to perform service advertisement in their respective networks. Service related information are communicated via beacon messaging, utilizing the service advertisement substructure 200 as described in FIG. 2A for example, during the beacon period 253 and/or via the plurality of advertisement subframes 255a, . . . , 255c.

Figure 3:
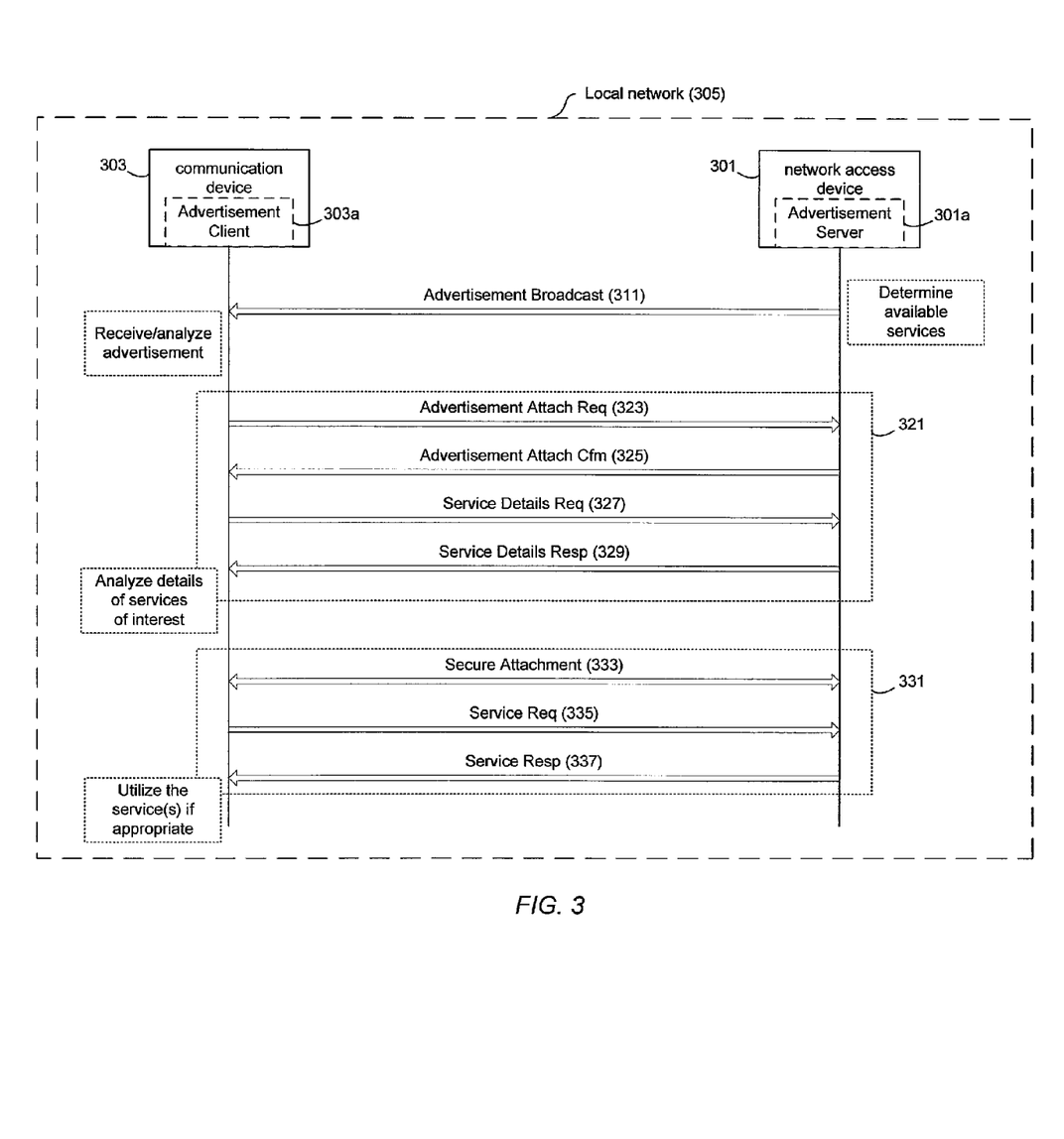
FIG. 3 is a diagram that illustrates messaging sequence that enables multi-stage attachment during service advertisement, in accordance with an embodiment of the invention.

FIG. 3 is a diagram that illustrates messaging sequence that enables multi-stage attachment during service advertisement, in accordance with an embodiment of the invention. Referring to FIG. 3, there is shown a messaging flow chart that shows interactions between an communication device 303 and a network access device 301, to enable facilitation of service advertisement in a local network 305 serviced by the network access device 301.

The network access device 301 comprises suitable logic, circuitry and/or code operable to establish and service the local network 305. The network access device 301 corresponds to, for example, the U-Spot servicing device 123, the private AP servicing device 125, the access point 183, and/or the routing device, substantially as described with regard to, for example, FIGS. 1A, 1B, and/or 1C. Accordingly, the local network 305 corresponds to, for example, the U-Spot network 133, the private AP network 135, the 802.11 WLAN 183, and/or the wired LAN 193. To enable performing service advertisement and/or attachment operations via the network access device 301, the network access device 301 comprises an advertisement server 301a. The advertisement server 301a comprises, for example, suitable logic, circuitry, and/or code operable to perform dedicated server-side service communication related management and/or control in the network access device 301, to facilitate service related communication between the network access device 301 and the communication device 303. The advertisement server 301a is operable to enable exchanging messaging with corresponding entity in the communication device 303.

The communication device 303 comprises suitable logic, circuitry and/or code operable to connect to, and communicate with the network access device 301, to receive, for example, services available in the local network 305. The end-point 301 corresponds to, for example, any of the communication devices 143, 145, 147, and/or 149, and/or the client device 185, 187, 189, 195, 197, and/or 199, substantially as described with regard to, for example, FIGS. 1A, 1B, and/or 1C. To enable performing service advertisement related operations via the communication device 303, the end-point 301 comprises an advertisement client 303a. The advertisement client 303a comprises, for example, suitable logic, circuitry, and/or code operable to perform dedicated client-side service related communication management and/or control in the communication device 303, to facilitate service related communication between the network access device 301 and the communication device 303.

In operation, the network access device 301 establishes and/or services the local network 305. Devices that may become communicatively coupled to the network access device 301, via one or more wired and/or wireless interfaces, are operable to receive services and/or network connectivity via the network access device 301. The network access device 301 is operable to determine, via the advertisement server 301a for example, services that may be offered in the local network 305. The network access device 301 is then operable to communicate, via advertisement broadcast 311, information about the services that may be available in the local network 305. The information provided via the advertisement broadcast 311 may be general, comprising, for example, a listing of available services and/or some parameters of the offered services. The advertisement broadcast 311 may be performed via beacon messaging and/or framing scheme, substantially as described with regard to, for example, FIGS. 2A and/or 2B.

The communication device 303 is operable to receive the advertisement broadcast 311, via the advertisement client 303a for example. The communication device 303 may then determine whether or not any of the services offered via the network access device 301 may be of interest. This determination may be performed based on predetermine criteria and/or based on interactions with users of the communication device 303. In an exemplary aspect of the invention, a service advertisement attachment stage 321 may be performed to enable the communication device 303 to obtain more detailed information about services deemed to be of interest. The communication device 303 sends, via the advertisement client 303*a*, an advertisement attach request message 323 to the network access device 301. The advertisement attachment may be a very minimal login procedure, rather than a full Remote Authentication Dial In User Service (RADIUS) procedure, and is limited to enabling the communication device 303 to obtain serviced related information. The servicing device sends an advertisement attach confirm message 325 to indicate to the communication device 303 whether or not the advertisement attachment was successful. In instances where the advertisement attachment is successful, the communication device 303 sends a service details request message 327 to obtain specific information pertaining to one or more specific services offered via the network access device 301, which were deemed to be of interest. The network access device 301 provides the requested information via service details response message 329. The service details messaging exchange may be repeated for other services. The communication device 303 then analyzes services based on detailed information provided to determine whether or not to request the services. The end-point 303 may then perform a secure servicing stage 331. The communication device 303 may perform a full and secure attachment 333 to the network access device 301, via RADIUS procedure for example, to enable performing security and/or accounting operations during services received via the local network 305. The communication device 303 sends service request message 335, and the servicing device sends service response message 337 to grant and/or deny requested services. In an exemplary aspect of the invention, the network access device 301 and the communication device 303 are operable to negotiate incentivized arrangements for services provided in the local network 305, to enhance servicing incentives with regard to the serviced devices, to the servicing devices, and/or to service providers. The negotiation messaging may be performed during the service advertisement attachment stage 321 and/or the secure servicing stage 331.

Figure 4:
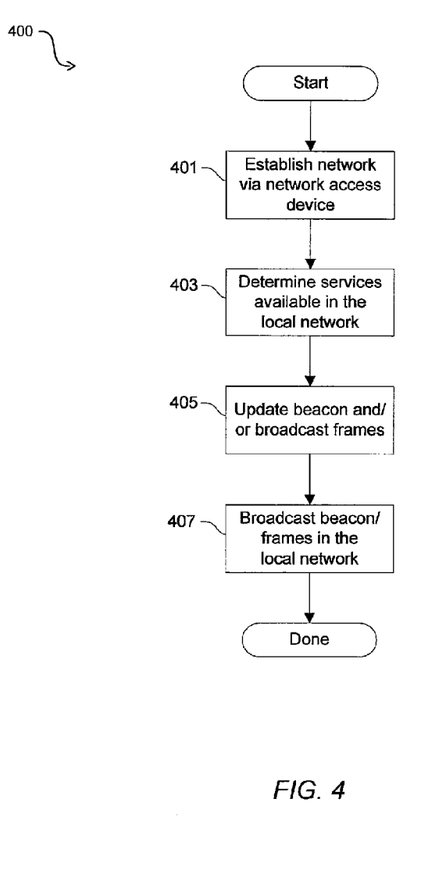
FIG. 4 is a flow chart that illustrates use of service advertisement operations in a local network, in accordance with an embodiment of the invention.

FIG. 4 is a flow chart that illustrates use of service advertisement operations in a local network, in accordance with an embodiment of the invention. Referring to FIG. 4, there is shown a flow chart 400 comprising a plurality of exemplary steps, which may enable service advertisement operations.

In step 401, a network access device establishes a network that enables servicing communication devices. For example, the U-Spot servicing device 123, the private AP servicing device 125, the access point 183, and/or the routing device 193, are operable to establish the U-Spot network 133, the private AP network 135, the 802.11 WLAN 181, and/or the wired LAN 191, respectively.

In step 403, the network access device determines services that may be offered in its network. For example, the U-Spot servicing device 123, the private AP servicing device 125, the access point 183, and/or the routing device 193, determine services that may be available in the U-Spot network 133, the private AP network 135, the 802.11 WLAN 181, and/or the wired LAN 191. The services may comprise, in addition to network connectivity, other service including, for example, media streaming, storage and/or processing.

In step 405, the network access device generates service advertisement information. For example, where the network access device utilizes beacon messaging and/or advertisement frames to communication service advertisement related information, the network access device generates instances of the service advertisement substructure 200, which may be incorporate into beacon messaging, and/or generates instances of the superframe 250, wherein the plurality of advertisement subframes 255*a*, . . . , 255*c* are created, populated, and/or scheduled. In step 407, the generated beacon based advertisement messaging and/or frames are broadcast by the network access device in its network.

Various embodiments of the invention may comprise a method and system for service advertisement communication in a communication device. The communication devices 143, 145, 147, and/or 149, and the client devices 185, 187, 189, 195, 197, 199 are operable to receive service advertisement related information broadcasted by the U-Spot servicing device 123, the private AP servicing device 125, the 802.11 access point 183, and/or the routing device 193. The Advertisement broadcast comprises information regarding services available in local networks via the servicing devices 123, 125, 183, and/or 193. The advertised services comprise, for example, providing media streaming, audio and/or video processing, and/or offline storage and/or processing. The services are available either directly via said the servicing devices 123, 125, 183, and/or 193, and/or via devices and/or systems that are external to and/or remote from said network access device, for example the remote resource 161 and/or the local resource 163.

The servicing devices may broadcast the advertisement information via beacon signals and/or utilizing advertisement framing procedure. In instances where beacon signal messaging is utilized for advertisement of service related information, the service advertisement substructure 200 is utilized to enable communicating service related information within the beacon messages. Service specific information may be provided via the plurality of service element fields 207, . . . , 209; each further comprising a plurality of parameters that are relevant to the advertised service. The advertisement framing procedure comprises communicating service advertisement information via the plurality of advertisement subframes 255*a*, . . . , 255*c*, within the Superframe 250, are utilized to communicate service related information by the servicing device.

The advertisement communication between the communication device 303 and the network access device 301 may comprise utilizing a multi-stage procedure. During the first stage of the advertisement communication, the communication device 303*s* are operable to only receive general and/or limited service related information, provided via the advertisement broadcast 311. The communication device 303, however, need not attach to the network access device 301 or securely login into the network serviced by the network access device 301. In instances where the communication device 303 determines, based on the advertisement broadcast 311, that at least some of the advertised services may be of interest, subsequent stages are performed.

During the service advertisement attachment stage 321, the communication device 303 is operable to request and/or receive more detailed information about services deemed to be of interest. In some instances, the advertisement attachment may comprise a very minimal login procedure, rather than a full RADIUS procedure, and is limited to enabling the communication device 303 to obtain serviced related information. In other instances, no login procedure is required and the broadcast advertised messages are received and their contents determined by communication device 303 or the communication devices 143, 145, 147, and/or 149, and the client devices 185, 187, 189, 195, 197, 199. The secure servicing stage 331 may then be performed, wherein the communication device 303 performs a full and secure attachment 333 to the network access device 301, via RADIUS procedure for example, to enable performing security and/or accounting operations during services received via the local network 305. The communication device 303 is operable, during secure servicing stage 331 for example, to negotiate for improved servicing operations and/or incentivized arrangements for services provided via the network access device 301.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for service advertisement communication in a communication device.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising:
receiving by a communication device, broadcasted information communicated from a network access device that is operable to service a plurality of communication devices, wherein said broadcasted information specifies one or more advertised services provided by said network access device;

transmitting, by the communication device, an ad attach request message to the network access device;

transmitting, by the communication device, one or more service details request messages to request more information from the network access device about one or more specific services offered via the network access device;

receiving, by the communication device, a service details response message in response to each service details request message, the service details response message including the requested more information;

determining whether to connect said communication device to said network access device, based on said received broadcasted information that specifies said provided one or more advertised services and the requested more information;

performing, at the communication device, a secure attachment to the network access device to enable security or accounting operations during receipt of services by the communication device from the network access device; and transmitting, by the communication device, a service request message once the secure attachment is complete.

2. The method according to claim 1, wherein said network access device comprises an IEEE 802.11 access point, a user end-point device, a private access point network access device, or a wired network routing device.

3. The method according to claim 1, wherein said broadcasted information communication is performed via beacon signals or utilizing advertisement framing procedure.

4. The method according to claim 3, wherein said beacon signals or advertisement frames are communicated based on IEEE 802.11 protocol.

5. The method according to claim 3, wherein said beacon signals comprise a plurality of service related fields, said service related fields are utilized when corresponding services are available via said network access device.

6. The method according to claim 3, wherein said advertisement framing procedure utilizes a plurality of subframes in a superframe to communicate service related information.

7. The method according to claim 1, wherein performing a secure attachment comprises a Remote Authentication Dial In user Service (RADIUS) procedure.

8. The method according to claim 7, wherein transmitting the ad attach request message and transmitting the one or more service details request messages are performed before performing the RADIUS procedure.

9. The method according to claim 1, wherein said services are available directly via said network access device, or via devices or systems that are external to or remote from said network access device.

10. A system for communication, the system comprising:
one or more circuits for use in a communication device, wherein said one or more circuits are operable to receive, by said communication device, broadcasted information communicated from a network access device that is operable to service a plurality of communication devices, and said broadcasted information specifies one or more advertised services provided by said network access device;

wherein said one or more circuits are further operable to:
transmit an ad attach request message to the network access device,
transmit one or more service details request messages to request more information from the network access device about one or more specific services offered via the network access device, and receive a service details response message in response to each service details request message, the service details response message including the requested more information;

said one or more circuits are operable to determine whether to connect said communication device to said network access device, based on said received broadcasted information that specifies said provided one or more advertised services and the requested more information; and said one or more circuits are operable to perform a secure attachment to the network access device to enable security or accounting operations during receipt of services by the communication device from the network access device and transmit a service require message to the network access device once the secure attachment is complete.

11. The system according to claim 10, wherein said network access device comprises an IEEE 802.11 access point, a user end-point device, a private access point network access device, or a wired network routing device.

12. The system according to claim 10, wherein said broadcasted information communication is performed via beacon signals or utilizing advertisement framing procedure.

13. The system according to claim 12, wherein said beacon signals or advertisement frames are communicated based on IEEE 802.11 protocol.

14. The system according to claim 12, wherein said beacon signals comprise a plurality of service related fields, said service related fields are utilized when corresponding services are available via said network access device.

15. The system according to claim 12, wherein said advertisement framing procedure utilizes a plurality of subframes in a superframe to communicate service related information.

16. The system according to claim 10, wherein the one or more circuits are operable to perform a Remote Authentication Dial In user Service (RADIUS) procedure.

17. The system according to claim 16, wherein the one or more circuits are operable to transmit the ad attach request message and the one or more service details request messages before performing the RADIUS procedure.

18. The system according to claim 10, wherein said services are available directly via said network access device, or via devices or systems that are external to or remote from said network access device.

19. A system, comprising:

one or more circuits for use in a communication device, said one or more circuits being operable to:

receive broadcasted information communicated from a personal network access device, wherein said broadcasted information specifies one or more advertised services provided by said personal network access device;

determine whether said received broadcasted information specifies one or more advertised services provided directly by said personal network access device; and when said received broadcasted information specifies said one or more advertised services, negotiate with said personal network access device, incentives for obtaining by said communication device at least one of said one or more advertised services, wherein:

said incentives are negotiated based on one or more connectivity or service related parameters; and said negotiation comprises requesting adjustment of at least one of said connectivity or service related parameters based on adjustment of said incentives.

20. The system according to claim 19, wherein said incentives comprise receiving compensation or credit, or adjusting billing data.

* * * * *